United States Patent
Chen et al.

(10) Patent No.: US 9,450,671 B2
(45) Date of Patent: Sep. 20, 2016

(54) TRANSMITTING AND RECEIVING APPARATUS AND METHOD FOR LIGHT COMMUNICATION, AND THE LIGHT COMMUNICATION SYSTEM THEREOF

(71) Applicant: INDUSTRIAL TECHNOLOGY RESEARCH INSTITUTE, Hsinchu (TW)

(72) Inventors: Chia-Pin Chen, Hsinchu (TW); Chang-Lung Hsiao, Zhubei (TW); Ren-Jr Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 44 days.

(21) Appl. No.: 13/671,085

(22) Filed: Nov. 7, 2012

(65) Prior Publication Data

US 2013/0251374 A1    Sep. 26, 2013

Related U.S. Application Data (60) Provisional application No. 61/613,477, filed on Mar. 20, 2012.

(51) Int. Cl.
*H04B 10/00*    (2013.01)
*H04B 10/114*   (2013.01)
*H04B 10/116*   (2013.01)

(52) U.S. Cl.
CPC ......... *H04B 10/1141* (2013.01); *H04B 10/116* (2013.01)

(58) Field of Classification Search
USPC ................................................ 398/181–131
See application file for complete search history.

(56) References Cited

U.S. PATENT DOCUMENTS 3,069,654 A    12/1962 Hough
6,101,299 A *  8/2000 Laor ................... G02B 6/3588
                                                        385/16

(Continued)

FOREIGN PATENT DOCUMENTS

CN    101232327 A    7/2008
KR    20120036254 A  4/2012

OTHER PUBLICATIONS

Taiwan Patent Office, Office Action, Patent Application Serial No. TW101146696, May 4, 2015, Taiwan.

(Continued)

*Primary Examiner* — David Payne
*Assistant Examiner* — Pranesh Barua
(74) *Attorney, Agent, or Firm* — Rabin & Berdo, P.C.

(57) ABSTRACT

According to one exemplary embodiment, a light communication system comprises a transmitting apparatus and a receiving apparatus. The transmitting apparatus generates one or more patterns of light to decide at least one reference area, and transmits signals by emitting light in the at least one reference area decided by the one or more patterns. The receiving apparatus takes measurements fewer than a total amount of pixels over a sensed image to detect the one or more patterns of light, and decides at least one ROI according to one or more detected one or more patterns; then takes all signals of light in the at least one ROI for processing of the light communication, and takes measurements fewer than a total amount of pixels over at least one tracking area for tracking the one or more patterns of light emitted by the transmitting apparatus.

10 Claims, 12 Drawing Sheets

(56) References Cited

U.S. PATENT DOCUMENTS

| | | | |
|---|---|---|---|
| 6,201,579 B1* | 3/2001 | Tamir | H04N 5/222 348/170 |
| 6,606,175 B1* | 8/2003 | Sampsell | H04B 10/1141 398/140 |
| 8,469,547 B2* | 6/2013 | Paolini | H05B 33/086 362/227 |
| 8,787,429 B2* | 7/2014 | Jovanovic | H04L 25/03019 370/315 |
| 2002/0191565 A1* | 12/2002 | Mani | H04B 10/25755 370/334 |
| 2004/0250207 A1* | 12/2004 | Gilbert | H03M 7/30 715/259 |
| 2005/0280662 A1* | 12/2005 | Tognoni | G09G 5/20 345/690 |
| 2006/0062582 A1 | 3/2006 | Suzuki et al. | |
| 2007/0024571 A1 | 2/2007 | Maniam et al. | |
| 2007/0058987 A1 | 3/2007 | Suzuki | |
| 2007/0101382 A1* | 5/2007 | Aramaki | G08B 13/19695 725/105 |
| 2007/0164308 A1* | 7/2007 | Yoshimura | C04B 35/584 257/103 |
| 2008/0063410 A1* | 3/2008 | Irie | H04B 10/1143 398/182 |
| 2008/0246833 A1* | 10/2008 | Yasui | H04N 7/142 348/14.08 |
| 2008/0298812 A1* | 12/2008 | Nagatomo | H04B 10/1149 398/173 |
| 2009/0074279 A1* | 3/2009 | Razifar | G06T 5/008 382/131 |
| 2009/0185802 A1 | 7/2009 | Choi et al. | |
| 2009/0269073 A1* | 10/2009 | Kitaji | H04B 10/1149 398/130 |
| 2010/0028021 A1 | 2/2010 | Shimada et al. | |
| 2010/0034540 A1 | 2/2010 | Togashi | |
| 2010/0067916 A1 | 3/2010 | Suzuki et al. | |
| 2010/0135669 A1 | 6/2010 | Kim et al. | |
| 2010/0195870 A1* | 8/2010 | Ai | G06T 7/208 382/103 |
| 2010/0207546 A1 | 8/2010 | Jung et al. | |
| 2010/0209118 A1* | 8/2010 | Takene | H04B 10/116 398/182 |
| 2011/0052214 A1 | 3/2011 | Shimada et al. | |
| 2011/0063510 A1 | 3/2011 | Lee et al. | |
| 2011/0102627 A1* | 5/2011 | Okada | H04N 5/772 348/222.1 |
| 2011/0103705 A1* | 5/2011 | Lee | H04N 19/29 382/251 |
| 2011/0135308 A1* | 6/2011 | Tarlazzi | H04B 7/0413 398/79 |
| 2011/0201269 A1* | 8/2011 | Hobbs | H04B 7/15535 455/9 |
| 2011/0241927 A1* | 10/2011 | Porikli | G01S 7/2923 342/90 |
| 2011/0243470 A1* | 10/2011 | Noguchi | H04N 19/176 382/239 |
| 2011/0249708 A1* | 10/2011 | Maca | H04B 7/15564 375/213 |
| 2012/0020582 A1* | 1/2012 | Le Leannec | H04N 19/176 382/239 |
| 2012/0076509 A1* | 3/2012 | Gurovich | H04B 10/60 398/212 |
| 2012/0087677 A1* | 4/2012 | Jang | H04B 10/116 398/183 |
| 2012/0105617 A1* | 5/2012 | Yoon | G06T 7/60 348/80 |
| 2012/0155889 A1* | 6/2012 | Kim | H04B 10/116 398/193 |
| 2012/0300078 A1* | 11/2012 | Ogata | G08G 1/166 348/148 |
| 2012/0301155 A1* | 11/2012 | Irie | H04B 10/116 398/182 |
| 2012/0309328 A1* | 12/2012 | Morrison | H04B 1/525 455/78 |
| 2012/0329523 A1* | 12/2012 | Stewart | H03F 1/3247 455/562.1 |
| 2013/0064465 A1* | 3/2013 | Tin | G06T 5/50 382/248 |
| 2013/0095870 A1* | 4/2013 | Phillips | H04W 52/146 455/501 |
| 2013/0265438 A1* | 10/2013 | Sugiyama | H04N 5/33 348/164 |
| 2013/0287313 A1* | 10/2013 | Marchessoux | G09G 5/10 382/274 |
| 2014/0022196 A1* | 1/2014 | Henry | G06K 9/3258 345/173 |
| 2014/0024402 A1* | 1/2014 | Singh | H04B 17/23 455/501 |
| 2014/0064348 A1* | 3/2014 | Braz | H04B 1/12 375/227 |
| 2014/0205016 A1* | 7/2014 | Yang | H04N 19/12 375/240.25 |

OTHER PUBLICATIONS

China Patent Office, Office Action, Patent Application No. CN201210561820.9, Dec. 3, 2015, China.

Toft, "Using the generalized Radon transform for detection of curves in noisy images", ICASSP, vol. 4, pp. 2219-2222, 1996.

O'Brien et al., "Visible Light Communications: Challenges and Possibilities", 2008 International Symposium on Personal Indoor and Mobile Radio Communications, pp. 1-5, 2008.

Bouchet et al., "Omega-project-flyer-2nd-edition-2011", Information & Communication Technologies (ICT), pp. 1-94, Feb. 2011.

Won et al., "Visible Light Communication: Tutorial", IEEE 802.15, pp. 1-78, Mar. 2008.

Komine et al., "Fundamental Analysis for Visible-Light Communication System using LED Lights", IEEE Trans. on Consumer Electronics, vol. 50, No. 1, pp. 100-107, Feb. 2004.

Tropp et al., "Signal Recovery from Random Measurements via Orthogonal Matching Pursuit", IEEE Trans. on Information Theory, vol. 53, No. 12, pp. 4655-4666, 2007.

* cited by examiner

TRANSMITTING AND RECEIVING APPARATUS AND METHOD FOR LIGHT COMMUNICATION, AND THE LIGHT COMMUNICATION SYSTEM THEREOF

CROSS-REFERENCE TO RELATED APPLICATION

The present application is based on, and claims priority from, U.S. Provisional Application No. 61/613,477, filed Mar. 20, 2012, the disclosure of which is hereby incorporated by reference herein in its entirety.

TECHNICAL FIELD

The present disclosure relates generally to a transmitting and receiving apparatus and method for light communication, and the light communication system and method thereof.

BACKGROUND

Figure 1:
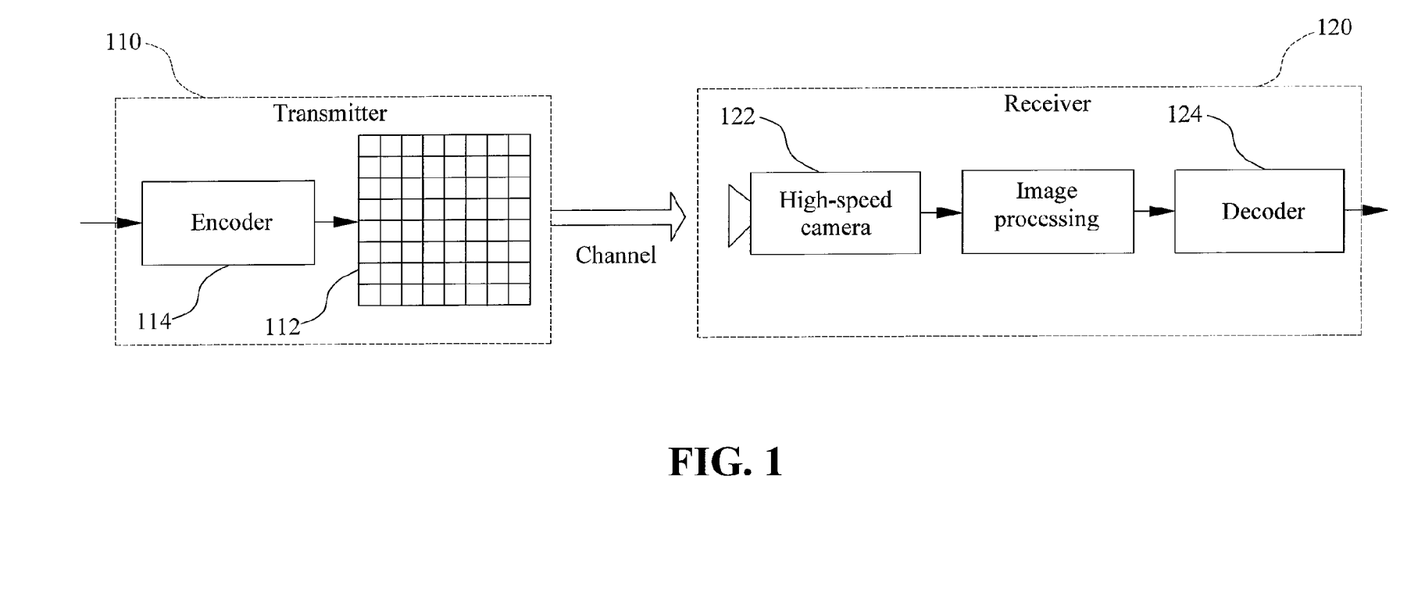
FIG. 1 shows a schematic view of an exemplary system model for light communications using an LED array and an image sensor.
Figure 2:
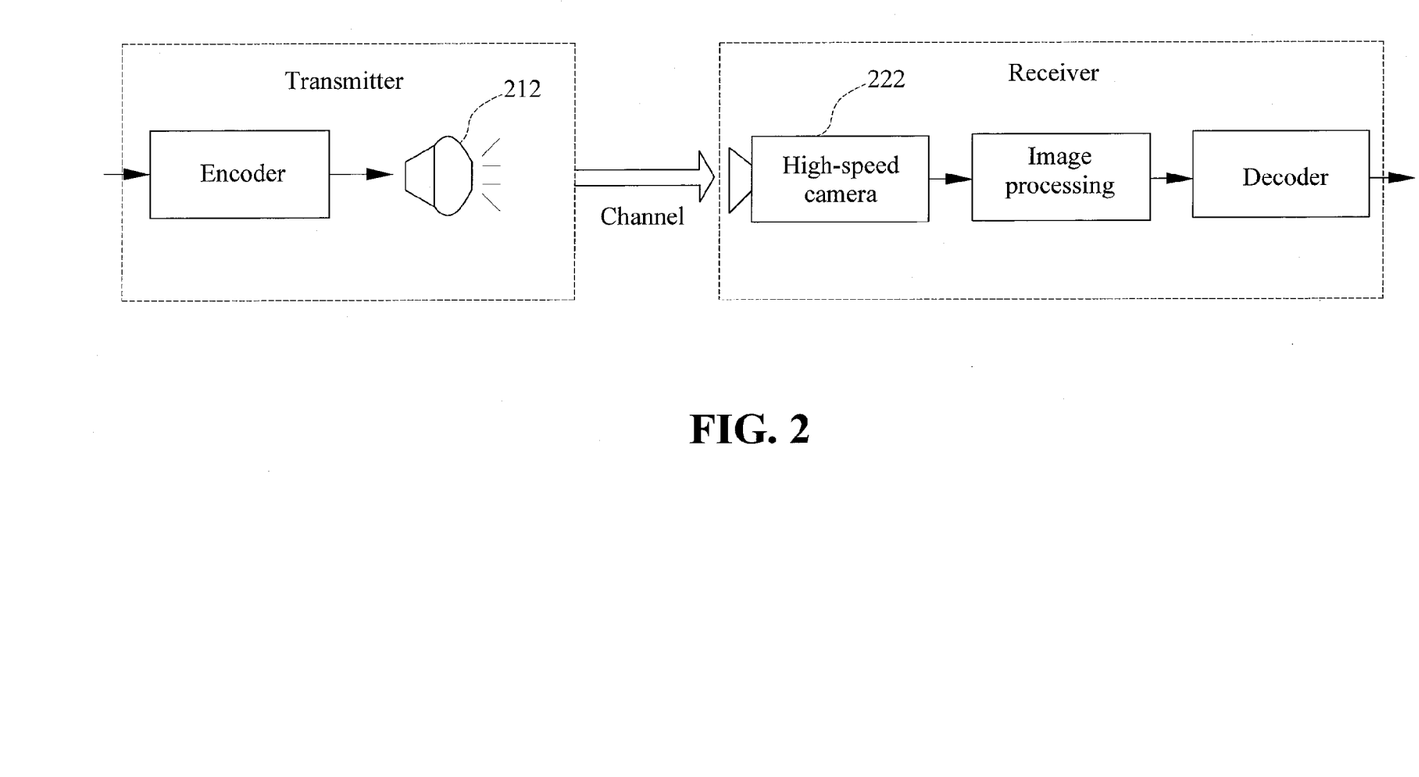
FIG. 2 shows a schematic view of another exemplary system model for light communications using a single LED and an image sensor.

Light communication is a wireless communication technology that uses light to accomplish communication, in which the light may be sensible by one or more photo diodes, or an image sensor. For example, the light may be, but not limited to, x-rays, ultra-violet light, visible light, or infrared with frequency being in the range from $10^9$ Hz to $10^{19}$ Hz. RF (radio waves) bandwidth is a scarce resource. Therefore, light communication may provide an alternate technology to meet the strong demands of wireless communications. For example, the visible light emitted from one or more light emitting diodes (LEDs) is widely used in homes and offices, thus it makes the visible light emitted from the one or more LEDs ideal for ubiquitous data transmitters. Cameras are pervasive on phones, laptops and many hand-held electronic devices. Thus an image sensor may be used not only as an incoming image detector, but also as a receiver in a visible light communication (VLC) system. FIG. 1 shows a schematic view of an exemplary system model for light communications using an LED array 112 and an image sensor such as a high-speed camera 122. As shown in FIG. 1, an encoder 114 in a transmitter 110 may perform the physical layer processing, such as error-correction encoding, modulation, OFDM, etc. A decoder 124 in a receiver 120 may perform the inverse signal processing of the encoder 114. FIG. 2 shows a schematic view of another exemplary another system model for light communications using a single LED 212 and an image sensor such as a high-speed camera 222.

An image sensor may be composed of an array of photosensites. CCD and CMOS are two basic types of digital sensors. For a CCD sensor, the first row of the array of photosensites is read into an output register, which in turn is fed into an amplifier and an analog to digital converter (ADC). After the first row has been read, it is dumped from the read out register and the next row of the array is read into the register. For a CMOS sensor, each photosite in the CMOS sensor has three or more transistors. The transistors allow for processing to be done right at the photosite, and each pixel/photosite can be accessed independently. For any one of the two types of image sensors, only one or few shared ADCs are used for all pixels in the sensed image in some existing light communication techniques.

Figure 3:
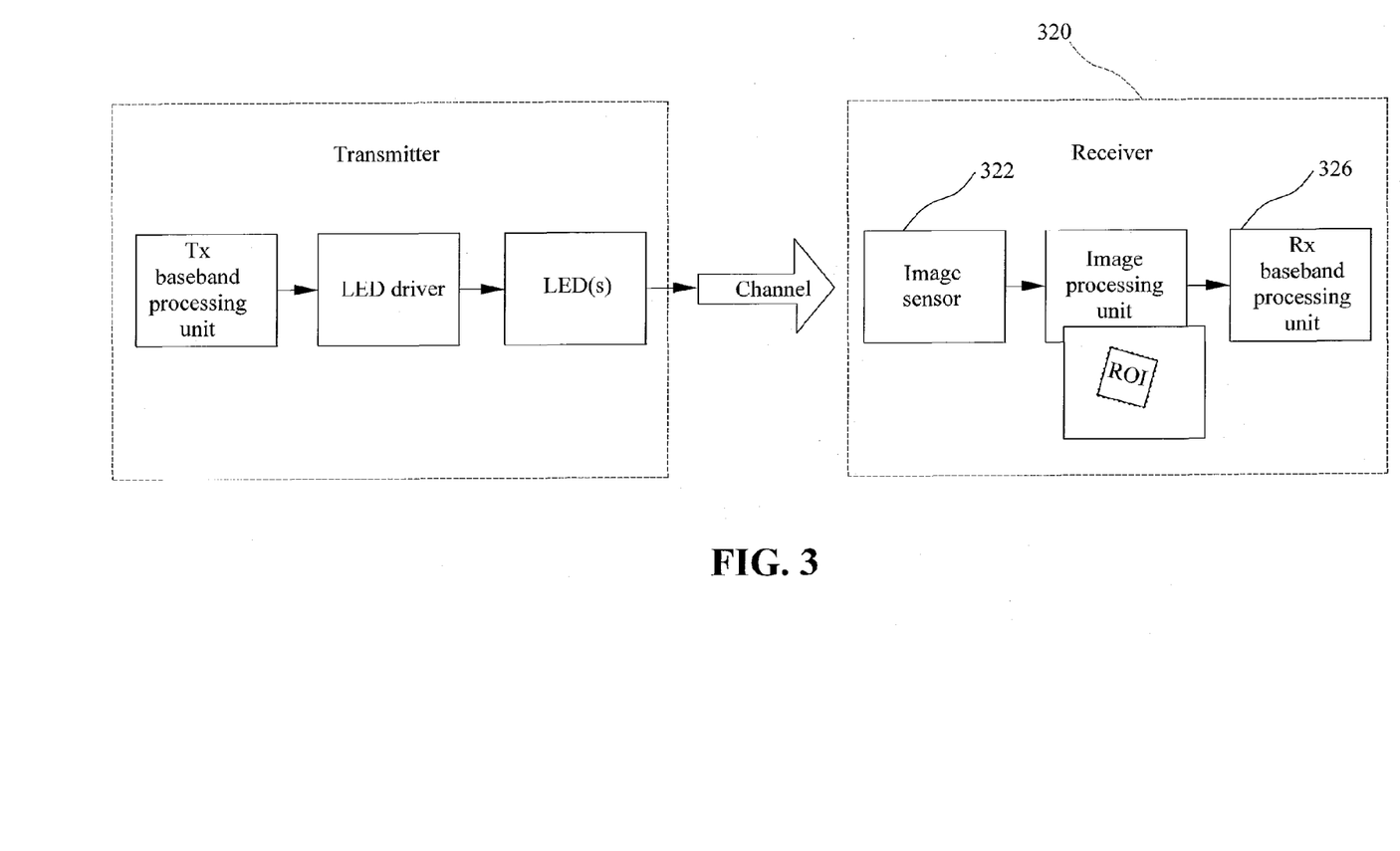
FIG. 3 shows a schematic view of a technique for visible light communication.

FIG. 3 shows a schematic view of a technique for visible light communication. In FIG. 3, the pixels in the non-interested region of the sensed image are also sampled by the shared ADC(s) of image sensors in a receiver 320, and then discarded by an Rx baseband processing unit 326 in the receiver 320. In other words, this technique takes all the photographed pixels from the image sensor 322, and uses a luminance change detection to detect the region of interest (ROI). Taking all pixels in an image may limit the frame rate up to several hundreds of frames per second. However, the data rate requirement for wireless communications usually has an order of 10 M to 1 G bits per second.

Figure 4:
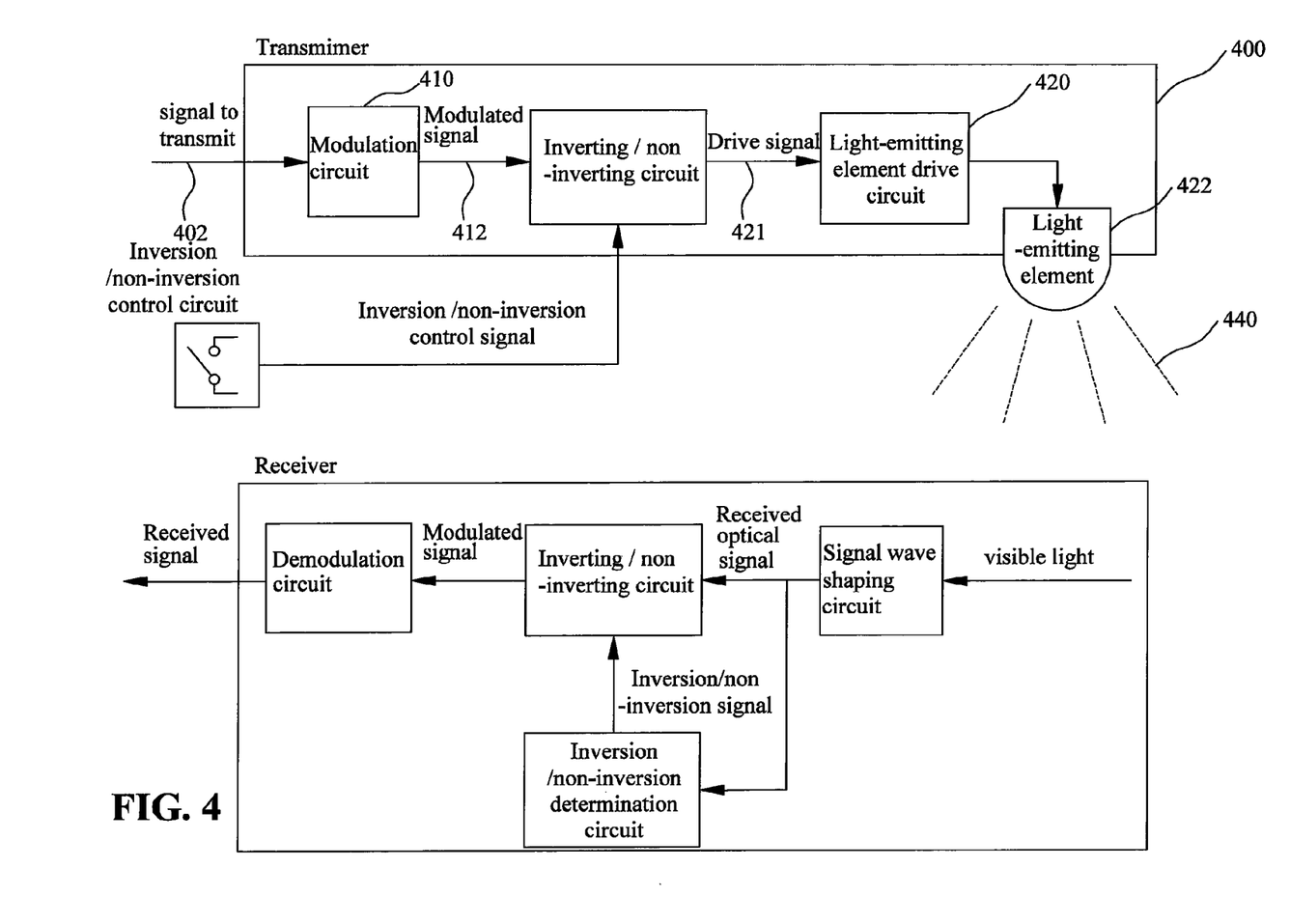
FIG. 4 shows a schematic view of another technique for visible light communication.

FIG. 4 shows a schematic view of another technique for visible light communication. In the visible light communication system of FIG. 4, a transmitter 400 has a modulation circuit 410 to generate different modulated signals 412, and a light-emitting drive circuit 420 to drive a light-emitting element 422 according to the modulated signals 412 output from the modulation circuit 410 and used as a drive signal 421. While the drive signal 421 remains at a high level, the light-emitting drive circuit 420 makes the light-emitting element 422 emit visible light 440 that is superposed with the signal 402. While the drive signal remains at a low level, the light-emitting drive circuit 420 makes the light-emitting element 422 emit no light.

Light communication is still a potential solution to the global wireless spectrum shortage. Various solutions for visible light communication techniques have been suggested. In general, the light-emitting devices such as LED(s), and the image sensor(s) such as camera, are existed devices in these solutions for visible light communication. However, the LED has low bandwidth in the frequency response, and the image sensor has low frame rate due to the shared ADC(s). There are challenges in these solutions for high data rate transmission of visible light communication.

SUMMARY

The exemplary embodiments of the disclosure may provide a transmitting and receiving apparatus and method for light communication, and the light communication system and method thereof One exemplary embodiment relates to a transmitting apparatus for light communication. The transmitting apparatus may comprise a pattern generation unit configured to generate one or more patterns to decide one or more reference areas; a light communication (LC) control unit that connects to a transmitter-baseband processing unit and the LC control unit selects its input from the transmitter-baseband processing unit or from the pattern generation unit; and a light emitting element that emits light in the one or more patterns or in the one or more reference areas decided by the one or more patterns.

Another exemplary embodiment relates to a transmitting method for light communication. The transmitting method may comprise: transmitting one or more patterns for at least one period to decide one or more reference areas, by using a light emitting element; and transmitting data, by using the light emitting element, by emitting light in the one or more reference areas decided by the one or more patterns.

Yet another exemplary embodiment relates to a receiving apparatus for light communication. The receiving apparatus may comprise an ROI decision unit, an image sensing element and an image processing unit. The ROI decision unit is configured to detect one or more patterns of light in a sensed image, and to decide at least one ROI according to at least one detected pattern. The image sensing element is configured to generate the sensed image and sense light according to an output generated by the ROI decision unit.

The image processing unit performs the image processing according to the output of the image sensing element in the at least one ROI.

Yet another exemplary embodiment relates to a receiving method for light communication. The receiving method may comprise: in an acquisition mode, taking a first plurality of measurements fewer than a total amount of pixels in a sensed image from an image sensing element to detect one or more patterns received, and deciding at least one ROI according to at least one detected pattern; and in a data receiving mode, taking all pixel data in the at least one ROI for processing of light communication.

Yet another exemplary embodiment relates to a light communication system. The system may comprise a transmitting apparatus and a receiving apparatus. The transmitting apparatus is configured to generate one or more patterns to decide at least one reference area, and transmit data by emitting light in the at least one reference area decided by the one or more patterns. The receiving apparatus is configured to detect the one or more patterns of light, and decides at least one ROI according to one or more detected one or more patterns, then take all signals of light in the at least one ROI for processing of light communication.

Yet another exemplary embodiment relates to a light communication method. The method may comprise: in a transmitting apparatus, generating one or more patterns of light to decide at least one reference area, and transmitting data by emitting light in the at least one reference area decided by the one or more patterns; and in a receiving apparatus, taking a first plurality of measurements fewer than a total amount of pixels over a sensed image to detect the one or more patterns of light, and deciding at least one ROI according to one or more detected one or more patterns, then taking all signals of light in the at least one ROI for processing of light communication.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a technique for light communication for increasing data rate. The technique detects the region of interest (ROI) for light communication to reduce a large degree of sampling rate of one or more shared ADC(s) in the image sensor. Once the ROI is decided by the receiver, the ADC(s) may be used only for the pixels in the region of interest. Compared with the existing light communication technologies, the disclosed exemplary embodiments may greatly increase the frame rate and also greatly reduce the acquisition time when light communication is performed. To accomplish this, a transmitter may emit one or more patterns of light and the patterns may be formed in one or more shapes, to decide the reference area. The light may be, but not limited to, x-rays, ultra-violet light, visible light or infrared with frequency being in the range from $10^9$ Hz to $10^{19}$ Hz. Then the transmitter may transmit signals by emitting the light in the reference area decided by the one or more patterns. In a receiver, a fewer amount of measurements than a total amount of pixels over a sensed image may be taken to detect the one or more patterns of the light emitted by the transmitter. The measurements may comprise random combinations of the pixels in the sensed image. Once the receiver decides the region of interest of the sensed image according to the detected one or more patterns, the receiver may take all the signals in the region of interest for further processing of light communication.

Figure 5:
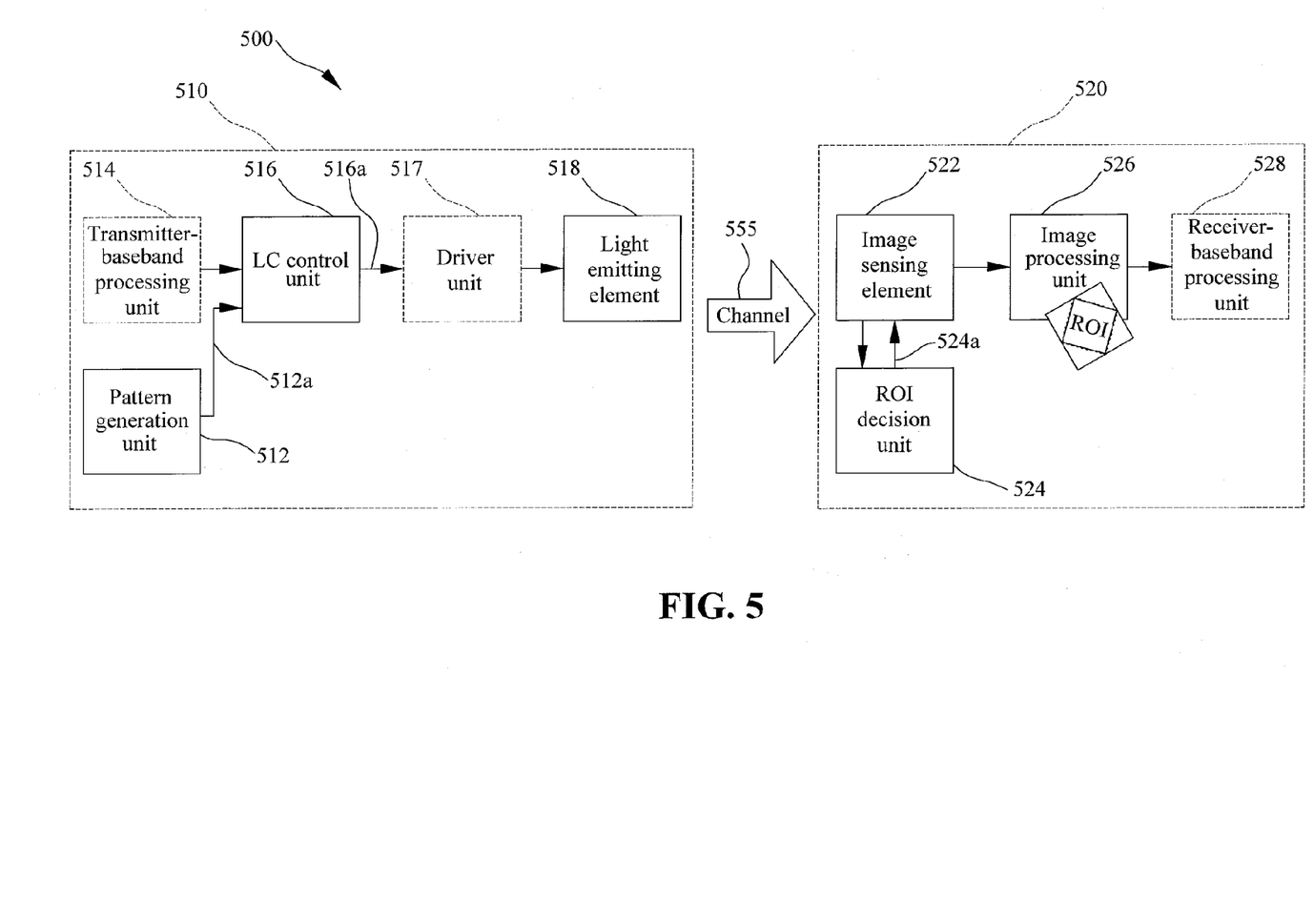
FIG. 5 shows a schematic view of a light communication system, according to an exemplary embodiment.

As seen in FIG. 5, one exemplary embodiment of a light communication system is disclosed. The light communication system 500 may comprise a transmitting apparatus 510 and a receiving apparatus 520. In the transmitting apparatus 510, a pattern generation unit 512 may be configured to generate one or more patterns 512a and the patterns may be formed in one or more shapes to decide one or more reference areas, a light emitting element 518 may emit light in the one or more reference areas decided by the one or more patterns 512a, and a light communication (LC) control unit 516 connected to a transmitter-baseband processing unit 514. The light emitting element may be, but not limited to, a single LED or an LED array. The LC control unit 516 may select its input from the transmitter-baseband processing unit 514 or from the pattern generation unit 512. The transmitter-baseband processing unit 514 connected to a light communication (LC) control unit 516 may perform a plurality of baseband operations for wireless communication, such as error-correction code encoding, interleaving, modulation, IFFT, etc. When the transmitting apparatus 510 is in a data transmitting period, the input of LC control unit 516 is selected from the transmitter-baseband processing unit 514. When the transmitting apparatus is in a reference region indication period, the input of the LC control unit 516 is selected from the pattern generation unit 512. A driver unit 517 such as an LED driver may attach each of one or more signals 516a generated by the LC control unit 516 as an AC current or voltage into a direct current (DC) bias of the light emitting element 518, and may drive the light emitting element 518 to emit light in the one or more reference areas decided by the one or more patterns 512a.

The emitted light in the one or more reference areas is transmitted to the receiving apparatus via a channel 555. In the receiving apparatus 520, an image sensing element 522, such as an image sensor, configured to sense light according to an output generated by an ROI decision unit 524, the ROI decision unit 524 is configured to detect the one or more patterns of light emitted from the transmitting apparatus 510 and decide at least one ROI 524a of a sensed image from the image sensing element 522 according to one or more detected patterns, and an image processing unit 525 performs processing of light communication according to the output of the image sensing element 522 in the ROI 524a. The output may be, such as RGB to YUV (or YCbCr), color adjustment, filtering, etc. The ROI decision unit may take a fewer amount of measurements than a total amount of pixels over the sensed image to detect the patterns of light received. The measurements may comprise random combinations of the pixels in the sensed image. The image processing unit 525 may further take a fewer amount of measurements than a total amount of pixels over at least one tracking region to track the patterns of light emitted by the transmitting apparatus.

The receiving apparatus 520 may further include a receiver-baseband processing unit 528, connected to the image processing unit 526 to perform the baseband processing for recovering received data, such as FFT, demodulation, deinterleaving, error correction, etc.

Accordingly, a light communication method may operate as follows. In a transmitting apparatus, the light communication method may generate one or more patterns of light and the patterns may be formed in one or more shapes to decide at least one reference area, and transmit data by emitting light in the at least one reference area decided by the one or more patterns. And, in a receiving apparatus, the light communication method may take a fewer amount of measurements than a total amount of pixels over a sensed image to detect the one or more patterns of light, and decide at least one ROI of the sensed image according to one or more detected one or more patterns, then take all signals of light in the at least one ROI for processing of light communication. In the receiving apparatus, the light communication method may further take fewer measurements than a total amount of pixels over at least one tracking area for tracking the one or more patterns of light emitted by the transmitting apparatus. The measurements may comprise random combinations of the pixels in the at least one tracking area.

As may be seen, due to the one or more patterns of light emitted by the transmitting apparatus 510, it may greatly reduce two quantities such as the sample amount of shared ADC(s) and computation complexity, about pattern detection in the receiving apparatus 520, thereby greatly reducing the acquisition time. After the ROI is decided by the receiving apparatus 520, the ADC(s) can be used only for the pixels in the ROI. Thus, the frame rate is increased greatly when light communication is performed.

Figure 6A:
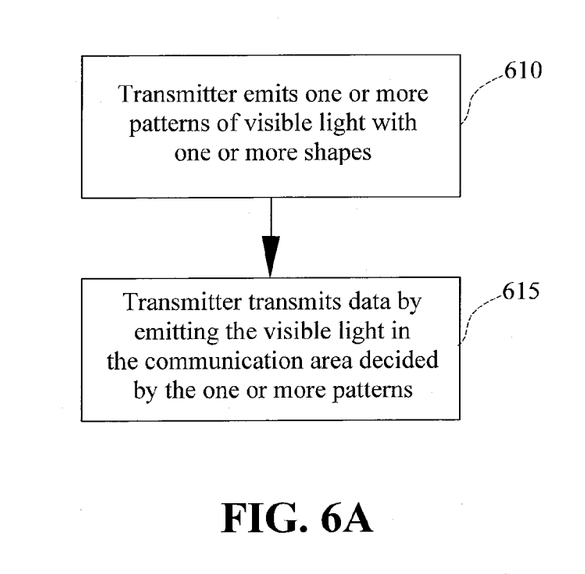
FIG. 6A shows an operation flow of a transmitting method for light communication, according to an exemplary embodiment.
Figure 6B:
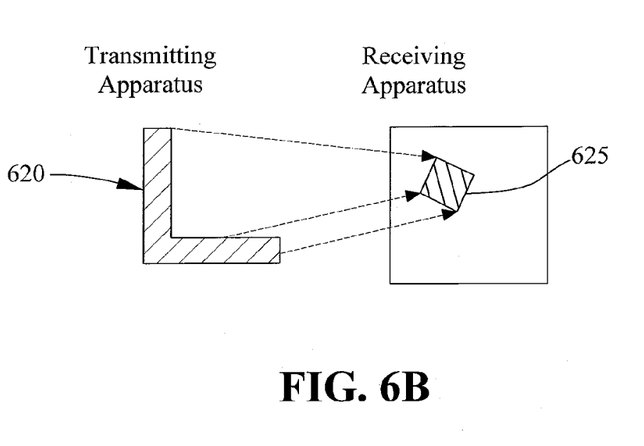
FIG. 6B shows a schematic view illustrating a transmitted pattern may decide a reference area, according to an exemplary embodiment.

FIG. 6A shows an operation flow of a transmitting method for light communication, according to an exemplary embodiment. In FIG. 6, the transmitting method firstly transmits one or more patterns 512a and the patterns may be formed in one or more shapes for at least one period to decide one or more reference areas (step 610). For light communication usage, the transmitting method may transmit data, by using a light emitting element, by emitting light in the one or more reference areas decided by the one or more patterns (step 615). FIG. 6B shows a schematic view illustrating a transmitted pattern 620 may decide a reference area 625, according to an exemplary embodiment. The one or more reference areas decided by the one or more patterns may identify the positions of the transmitting apparatus such as in the case of multiple light sources, or be used for transmitting signals for light communication. The transmitting method may further include using a light communication control unit to select the one or more patterns as its input, or select its input from a transmitter-baseband processing unit that performs a plurality of baseband operations for wireless communication.

Figure 7A:
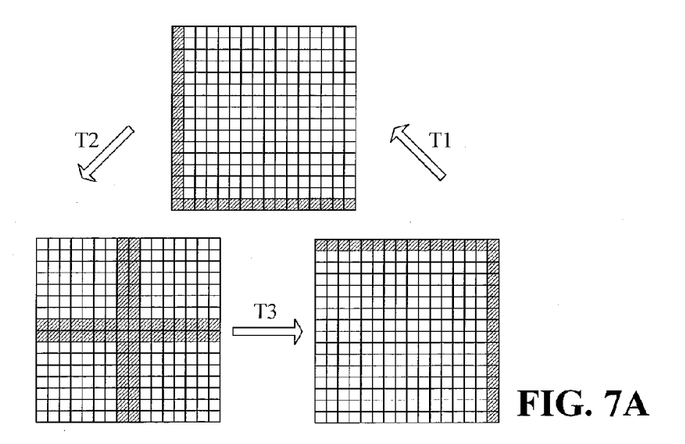
FIG. 7A shows an exemplar of a pattern emitted by a 16×16 LED array, according to an exemplary embodiment.
Figure 7B:
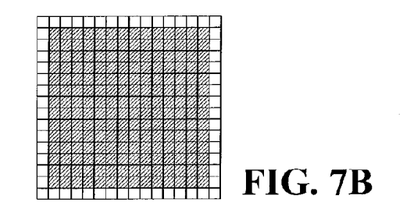
FIG. 7B shows an exemplary reference area presented by the dotted LEDs, according to an exemplary embodiment.
Figure 7C:
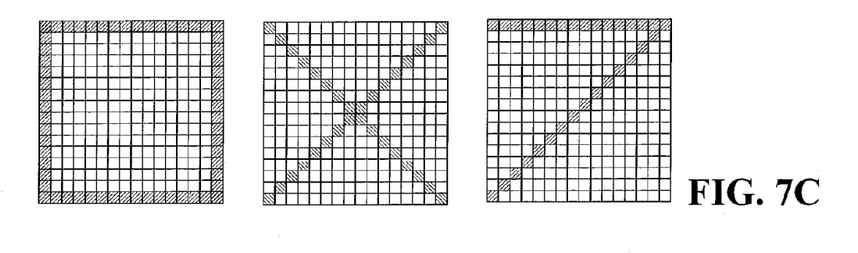
FIG. 7C shows three of other patterns emitted by an LED array, according to exemplary embodiments.

The transmitted one or more patterns may form a time-variant sequence. FIG. 7A shows an exemplar of three patterns emitted by a 16×16 LED array at three different times, according to exemplary embodiments. In FIG. 7A, the small squares with slash lines represent the turned on LEDs and the blank squares represent the turned off LEDs. The three arrows represent the three different times, i.e. time T1, time T2, and time T3, respectively. Thus the turned on LEDs may form a time-variant sequence of patterns, and each pattern may contain the boundary or the center of the LED array and may decide a reference area. To reduce the detecting complexity and time in the receiver side, a transmitted pattern may only comprise two lines. FIG. 7B shows an exemplary reference area presented by the dotted LEDs, according to an exemplary embodiment. The data in the reference area may be transmitted by the LEDs via on-off keying of modulation schemes. FIG. 7C shows three of other patterns emitted by an LED array, according to exemplary embodiments.

Figure 8:
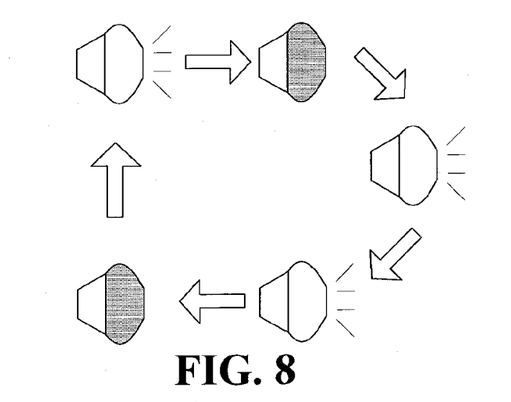
FIG. 8 shows an exemplary pattern emitted by a single LED transmitter at five different times, according to one exemplary embodiment.

FIG. 8 shows an exemplary pattern emitted by a single LED transmitter at five different times, according to one exemplary embodiment. In FIG. 8, a grey bubble indicates that the single LED is turned off and a white bubble indicates the single LED is turned on. The pattern is formed by turning on and off the single LED periodically. The five arrows represent the $1^{st}$ period up to the $5^{th}$ period, respectively. The reference area is equal to the lighting area of the single LED. After the pattern is formed, the single LED may start to transmit data by turning on-off or adjusting the level of voltage or current of the single LED.

Figure 9:
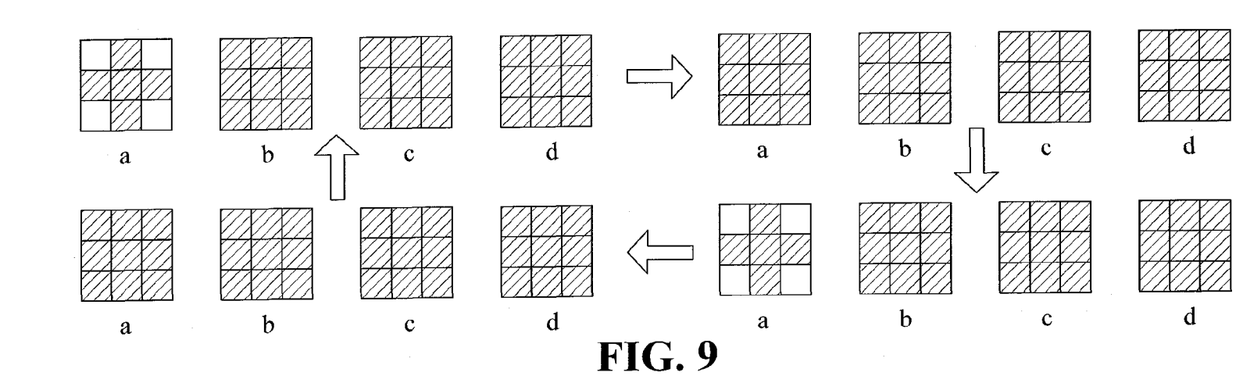
FIG. 9 shows another exemplar of transmitted patterns for multiple light sources, according to one exemplary embodiment.

FIG. 9 shows another exemplar of transmitted one or more patterns for multiple light sources, according to one exemplary embodiment. As seen in FIG. 9, there are four light sources, denoted by light source "a" to light source "d", and only the light source "a" is used as a transmitter for light communication. Thus only the light source "a" emits a pre-defined and time-variant pattern to identify its position. In other words, the reference area decided by the pre-defined and time-variant pattern may be used to identify the position of the light source that emits the pre-defined and time-variant pattern.

Figure 10:
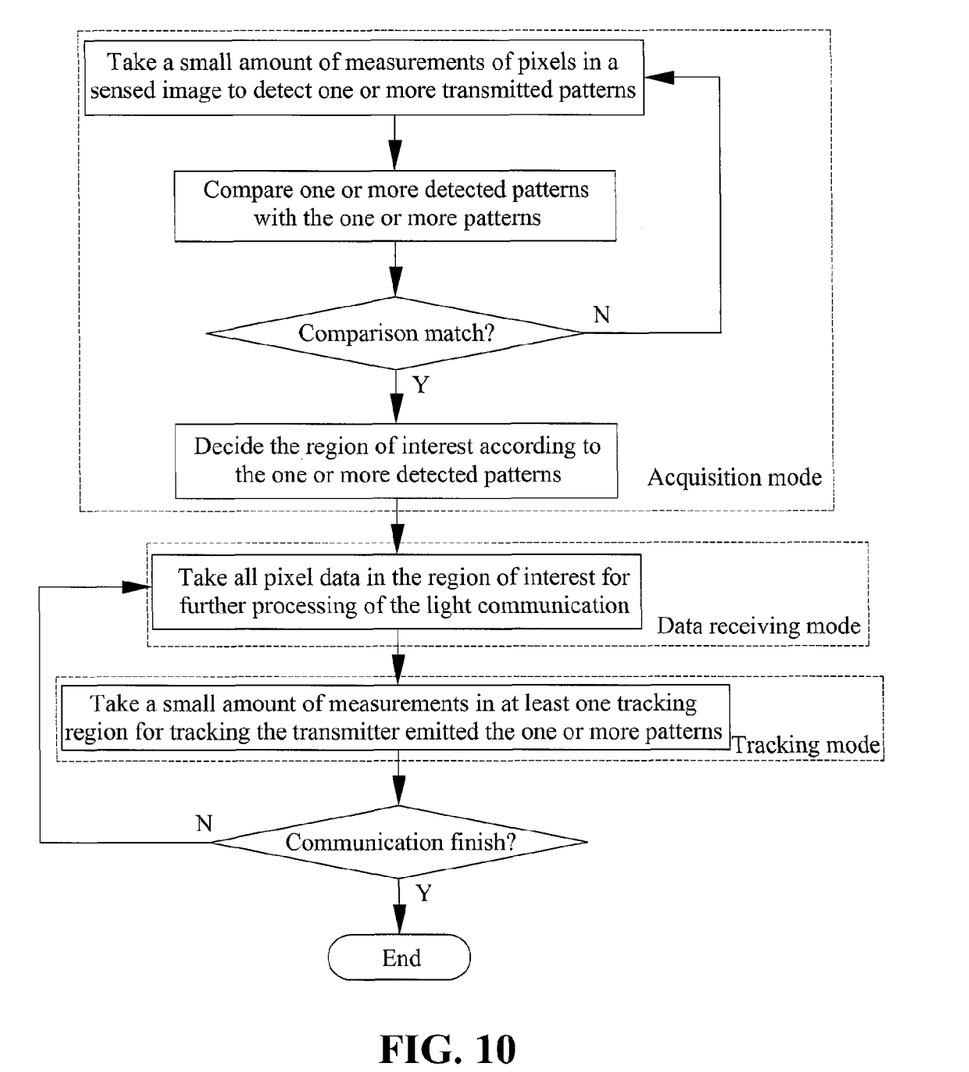
FIG. 10 shows an operation flow of a receiving method for light communication, according to an exemplary embodiment.

FIG. 10 shows an operation flow of a receiving method for light communication, according to an exemplary embodiment. The receiving method may include three modes of operations, i.e. acquisition mode, data receiving mode and tracking mode. In the acquisition mode, the receiving method takes a small amount of measurements of the pixels in a sensed image from an image sensing element to detect one or more transmitted patterns. The measurements may comprise random combinations of the pixels in the sensed image. The amount of measurements taken in the acquisition mode is fewer than the total amount of the pixels in the sensed image from, for example, the image sensing array in an image sensor. The receiving method then compares the detected pattern(s) with the one or more patterns saved in a memory means. If a successful matched result is obtained from the comparison, the receiving method decides a ROI (region of interest) according to the detected pattern(s). If no such a successful matched result is obtained from the comparison, the receiving method continues to perform the above pattern detection operations in the acquisition mode.

After the ROI is decided, the receiving method may enter the data receiving mode. In the data receiving mode, the receiving method takes all pixel data in the ROI for further processing of light communication, such as image processing and Rx baseband processing. The pixel data may be taken from the sensed image or from signals of light. After finishing the processing of light communication for the ROI, the receiving method may enter the tracking mode. In the tracking mode, the receiving method takes a fewer amount of measurements than a total amount of pixels in at least one tracking region for tracking the position of the transmitter that transmits one or more patterns. The ROI may be refined according to a pattern detection result in the tracking mode. When the ROI is refined, the receiving method returns to the data receiving mode for receiving data. The processes of data receiving mode and tracking mode may continue iteratively until the light communication is done.

Figure 11A:
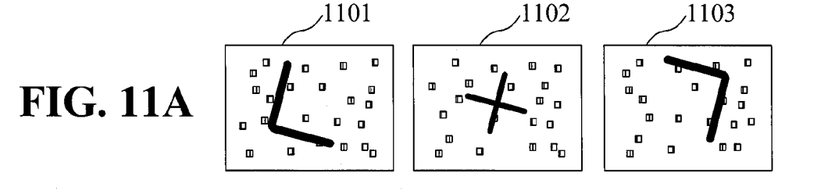
FIGS. 11A to 11F show an exemplary flow of a light communication system having a light emitting element implemented by an LED array, according to exemplary embodiments.
Figure 11B:
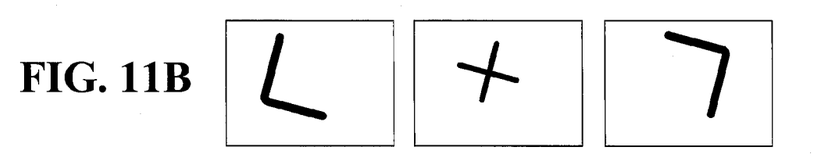
Figure 11C:
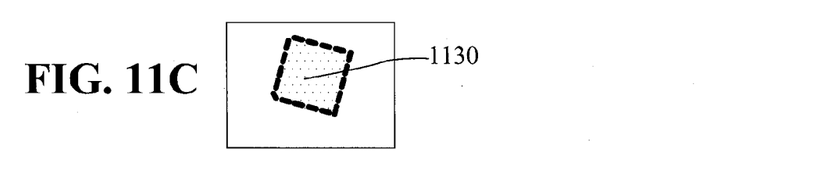
Figure 11D:
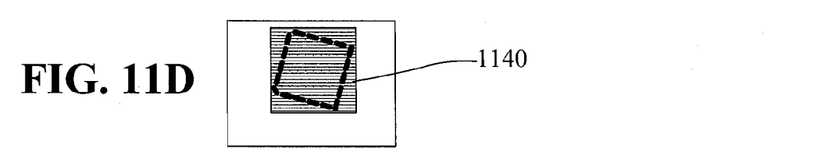
Figure 11E:
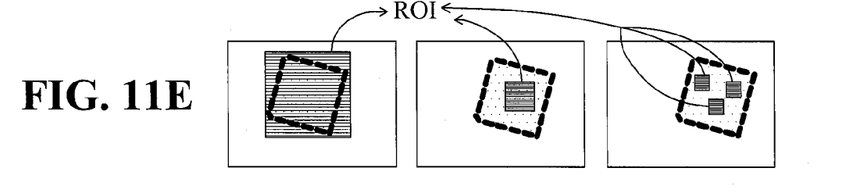
Figure 11F:
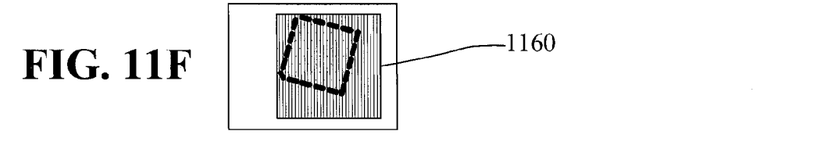

FIGS. 11A to 11F show an exemplary flow of a light communication system having a light emitting element implemented by an LED array, according to exemplary embodiments. In FIG. 11A, three images 1101 to 1103 are sensed by an image sensing array in the image sensor at three different times, the small grey squares in each image are the measurements taken by an ADC of the receiving apparatus in the acquisition mode, wherein the measurements are the RGB values of the pixels, and the bold lines in each whole image are the patterns transmitted by the transmitting apparatus. After performing the image processing on the measurements taken by the ADC for each image, such as transferring the RGB pixel values to the luminance represented pixel values, applying the orthogonal matching pursuit (OMP) to the under-determinant luminance represented pixel values and a product matrix, the parameters of the lines forming the patterns on each image may be detected, as shown in FIG. 11B. In FIG. 11C, a reference area 1130 is determined according to the detected patterns on the three images and shown by the dotted part. The reference area may be, but not limited to, a largest area enclosed by the lines detected in FIG. 11B. The ADC of the receiving apparatus takes every sample in an ROI 1140 containing the reference area 1130 and represented by the square filling with vertical lines, as shown in FIG. 11D, for further processing of the light communication. The ROI 1140 may be larger, smaller than or equal to the reference area 1130 in various implementations. Also, an ROI may comprise one region or a union of a plurality of smaller regions, as shown in FIG. 11E. In FIG. 11F, the horizontal lines represent a tracking area 1160 in which the receiving apparatus may take a fewer amount of measurements than a total amount of pixels of the tracking area 1160 for further tracking the position of the transmitting apparatus.

Figure 12:
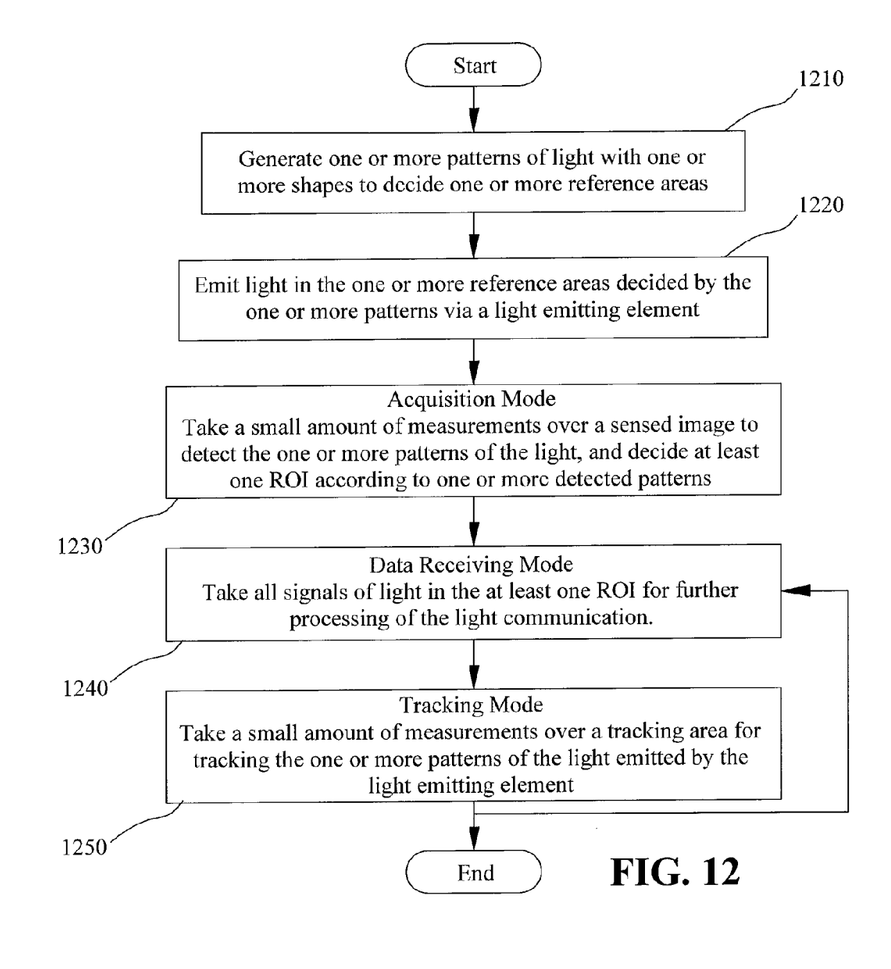
FIG. 12 shows a light communication method, according to an exemplary embodiment.

FIG. 12 shows a light communication method, according to an exemplary embodiment. As seen in FIG. 12, the light communication method may generate one or more patterns of light and the patterns may be formed in one or more shapes to decide one or more reference areas (step 1210), and emit light in the one or more reference areas decided by the one or more patterns via a light emitting element (step 1220). In an acquisition mode 1230, the light communication method may take a fewer amount of measurements (a first plurality of measurements) than a total amount of pixels over a sensed image to detect the one or more patterns of the light, and decide at least one ROI according to one or more detected patterns. In a data receiving mode 1240, the light communication method may take all signals of light in the at least one ROI for further processing of the light communication. The light communication method may further enter a tracking mode. In the tracking mode 1250, the light communication method may take a fewer amount of measurements (a second plurality of measurements) than a total amount of pixels over a tracking area for tracking the one or more patterns of the light emitted by the light emitting element. The details of generating one or more patterns of light and the one or more patterns thereof have been described in the earlier exemplary embodiments, and omitted here.

The techniques of compressive sensing and Generalized Hough Transform (GHT) or Radon transform may be applied to detect the transmitted patterns from under-determinant random measurements. The detailed process is explained as follows. Let $P=\{\pi_1, \pi_2, \ldots \pi_N\}$ be a set of possible parameters in a parameter space, where the parameter space may be the collections of lines, circles or arbitrary shapes of geometric graphs or any of the combinations. Let a parameter vector p be an indicator function, i.e., the k-th element of p is nonzero if the parameter $\pi_k$ is contained in an image. For example, three sensed images of FIG. 7A correspond to three indicator functions p1, p2 and p3, respectively. Each image in FIG. 7A contains two lines, and each indicator function thus contains only two nonzero entries. In other words, M lines in a 2-dimensional image space equal to M points in the parameter space after the GHT. For an image f, the relation between f and p may be written as f=Hp, where H is an inverse operator of GHT or an inverse operator of Random transform. Because the indicator function p is sparse, the theory for compressive sensing may be applied. Thus the receiving apparatus in the disclosed exemplary embodiments may take under-determinant random measurements instead of sampling a whole image, to detect the transmitted patterns by the indicator function p. Let y be the random measurements, and the size of y is much smaller than the size of a whole image. A relation of $y=\Psi f=\Psi Hp$ is hold, where $\Psi$ is a set of basis vectors of the random measurements. The indicator function p may be recovered by an estimator of $\hat{p}=\arg\min \|p\|_1$ that satisfies a constraint, i.e. $y=\Psi Hp$. Thus, it is better that the number of lines included in a transformed pattern is as smaller as possible.

Figure 13:
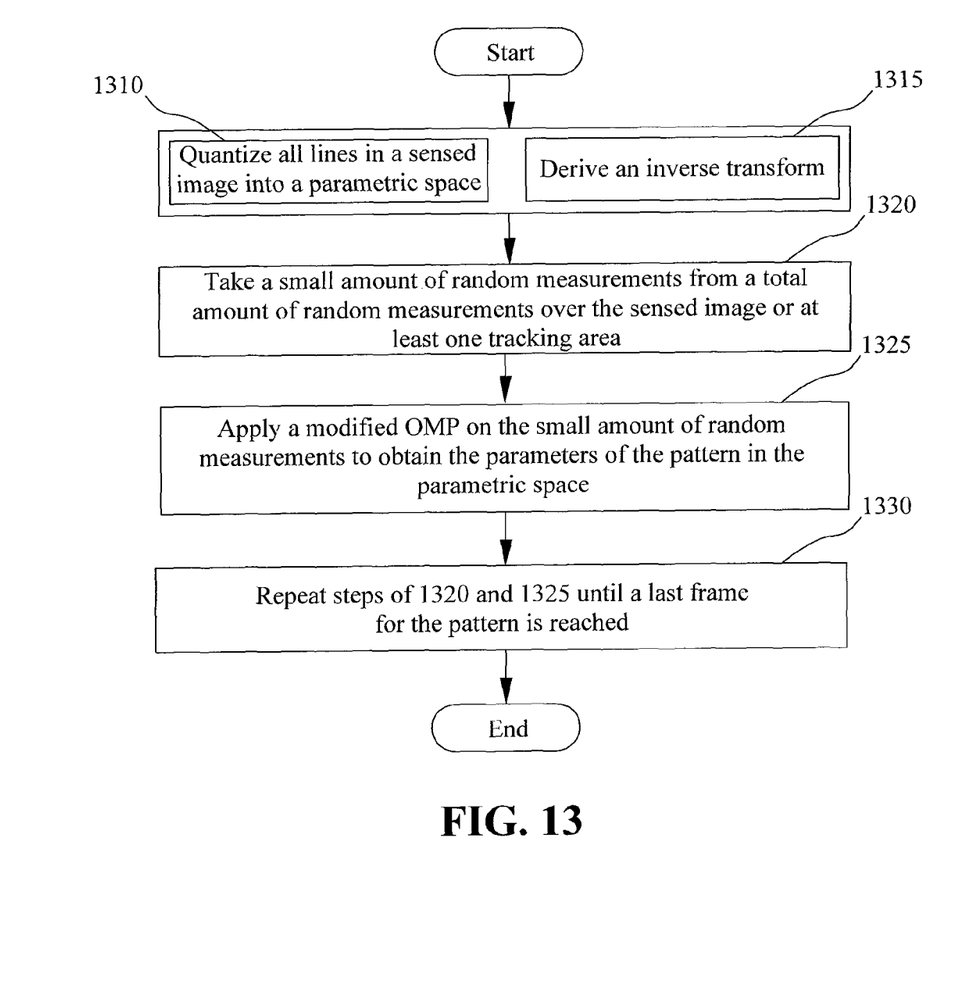
FIG. 13 shows a scheme to detect a pattern in the acquisition mode or the tracking mode, according to one exemplary embodiment.

FIG. 13 shows a scheme to detect a pattern in the acquisition mode or the tracking mode, according to one exemplary embodiment. As seen in FIG. 13, the scheme first quantizes all lines in a sensed image into a parametric space (step 1310), and derives an inverse transform (step 1315) such as a Hough transform or a random transform. An application exemplar of generating a matrix for the inverse Hough transform may be performed by taking an angle θ being in the range (0°, 180°), a radius r being in a range such as (−25, 25), Δθ being equal to such as 2° and Δr being equal to such as 3, then obtaining a size of the parametric space in the (r, θ) coordinate system, wherein the size may be calculated as (180/Δθ)×(50/Δr), that is equal to 1530. Then the scheme takes a small amount of random measurements (a first plurality of measurements or a second plurality of measurements) from a total amount of random combinations of the pixels over the sensed image (the first measurements) or at least one tracking area (the second measurement) (step 1320), and applies a modified OMP on the small amount of random measurements to obtain the parameters of the pattern in the parametric space (step 1325). An application exemplar for the small amount of measurements needed to be taken for the pattern may be calculated as C×k×log(N/k), wherein C is a constant, k is the number of lines in the pattern, and N is the number of pixels in the sensed image. The steps of 1320 and 1325 are repeated until a last frame for the pattern is reached (step 1330).

In summary of the disclosure, the above exemplary embodiments provide a transmitting and receiving apparatus and method for light communication, and the light communication system and method thereof. The light communication system comprises a transmitting apparatus and a receiving apparatus. The transmitting apparatus generates one or more patterns of light and the patterns may be formed in one or more shapes to decide one or more reference areas; and transmits signals by emitting the light in the one or more reference areas decided by the one or more patterns. In an acquisition mode, the receiving apparatus takes a fewer amount (first amount) of measurements than a total amount of pixels over a sensed image to detect the one or more patterns of light, and decides at least one ROI of the sensed image according to one or more detected patterns. In a data receiving mode, the receiving apparatus takes all signals of the light in the at least one ROI for further processing of the light communication. In a tracking mode, the receiving apparatus further takes a fewer amount (second amount) of measurements than a total amount of pixels over at least one tracking area for tracking the one or more patterns of light emitted by the transmitting apparatus. Compared with existing light communication technologies, when light communication is performed, the exemplary embodiments of the disclosure may greatly increase the frame rate and also greatly reduce the acquisition time.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A transmitting apparatus for light communication, comprising:
  a pattern generation unit configured to generate one or more patterns formed in one or more two-dimensional shapes to decide one or more reference areas;
  a light communication (LC) control unit that connects to the pattern generation unit and a transmitter-baseband processing unit that performs baseband operations for wireless communication, the LC control unit selects its input from said transmitter-baseband processing unit in a data transmitting period or from said pattern generation unit in a reference region indication period and the LC control unit generates one or more signals to a driver unit, wherein the LC control unit is separate from the driver unit; and
  a light emitting element that connects to the driver unit and that emits light in said one or more patterns or in said one or more reference areas decided by said one or more patterns;
  wherein
  the one or more references areas decided by said one or more patterns identify one or more positions of one or more light sources of the light emitting element that emit said one or more patterns; and
  based on said one or more patterns being detected, a receiving apparatus corresponding to the transmitting apparatus decides least one region-of-interest (ROI) of a sensed image for further processing of a light communication of the LC control unit or tracking said one or more patterns.

2. The apparatus as claimed in claim 1, wherein said one or more patterns form a time-variant sequence.

3. The apparatus as claimed in claim 1, wherein said one or more reference areas decided by the one or more patterns is used for transmitting a plurality of signals for light communication.

4. The apparatus as claimed in claim 1, further comprising a driver unit to drive the light emitting element to emit light.

5. A transmitting method for light communication, comprising:
  generating one or more patterns formed in one or more two-dimensional shapes, using a pattern generation unit;
  transmitting the one or more patterns formed in one or more two-dimensional shapes for at least one period to decide one or more reference areas, by using a light emitting element that connects to a driver unit;
  transmitting data, by using the light emitting element, by emitting light in said one or more reference areas decided by said one or more patterns; and
  using a light communication control unit that connects to the pattern generation unit and to a transmitter-baseband processing unit to select said one or more patterns as its input in a reference region indication period, or select its input in a data transmitting period from the transmitter-baseband processing unit that performs a plurality of baseband operations for wireless communication, and to generate one or more signals to the driver unit, wherein the light communication control unit is separate from the driver unit;
  wherein
  the one or more references areas decided by said one or more patterns identify one or more positions of one or more light sources of the light emitting element that emit said one or more patterns; and
  based on said one or more patterns being detected, a receiving method corresponding to the transmitting method decides least one region-of-interest (ROI) of a sensed image for further processing of a light communication or tracking said one or more patterns.

6. The transmitting method as claimed in claim 5, wherein said light in the one or more reference areas is emitted by an LED array via on-off keying of one of modulation schemes.

7. The transmitting method as claimed in claim 5, wherein said one or more patterns are formed by turning on and off a single LED periodically.

8. The transmitting method as claimed in claim 5, wherein said one or more patterns form a time-variant sequence.

9. A light communication method, comprising:
- in a transmitting apparatus, using a pattern generation unit to generate one or more patterns of light formed in one or more two-dimensional shapes to decide at least one reference area, and transmitting data by emitting light in the at least one reference area decided by the one or more patterns;
- using a light communication control unit that connects to the pattern generation unit and to a transmitter-baseband processing unit to select said one or more patterns as its input in a reference region indication period, or select its input in a data transmitting period from the transmitter-baseband processing unit that performs a plurality of baseband operations for wireless communication, and to generate one or more signals to a driver unit, wherein the light communication control unit is separate from the driver unit;
- wherein
- the at least one reference area decided by said one or more patterns identifies one or more positions of one or more light sources of a light emitting element that connects to the driver unit and emits said one or more patterns; and
- based on said one or more patterns being detected, a receiving apparatus corresponding to the transmitting apparatus decides least one region-of-interest (ROI) of a sensed image for further processing of a light communication or tracking said one or more patterns.

10. The method as claimed in claim 9, wherein said one or more patterns form a time-variant sequence.

\* \* \* \* \*